Jan. 1, 1952  M. FOUQUART  2,581,011
ELECTRONIC VOLTMETER WITH CALIBRATED RESISTORS
Filed Feb. 27, 1946

INVENTOR
M. FOUQUART

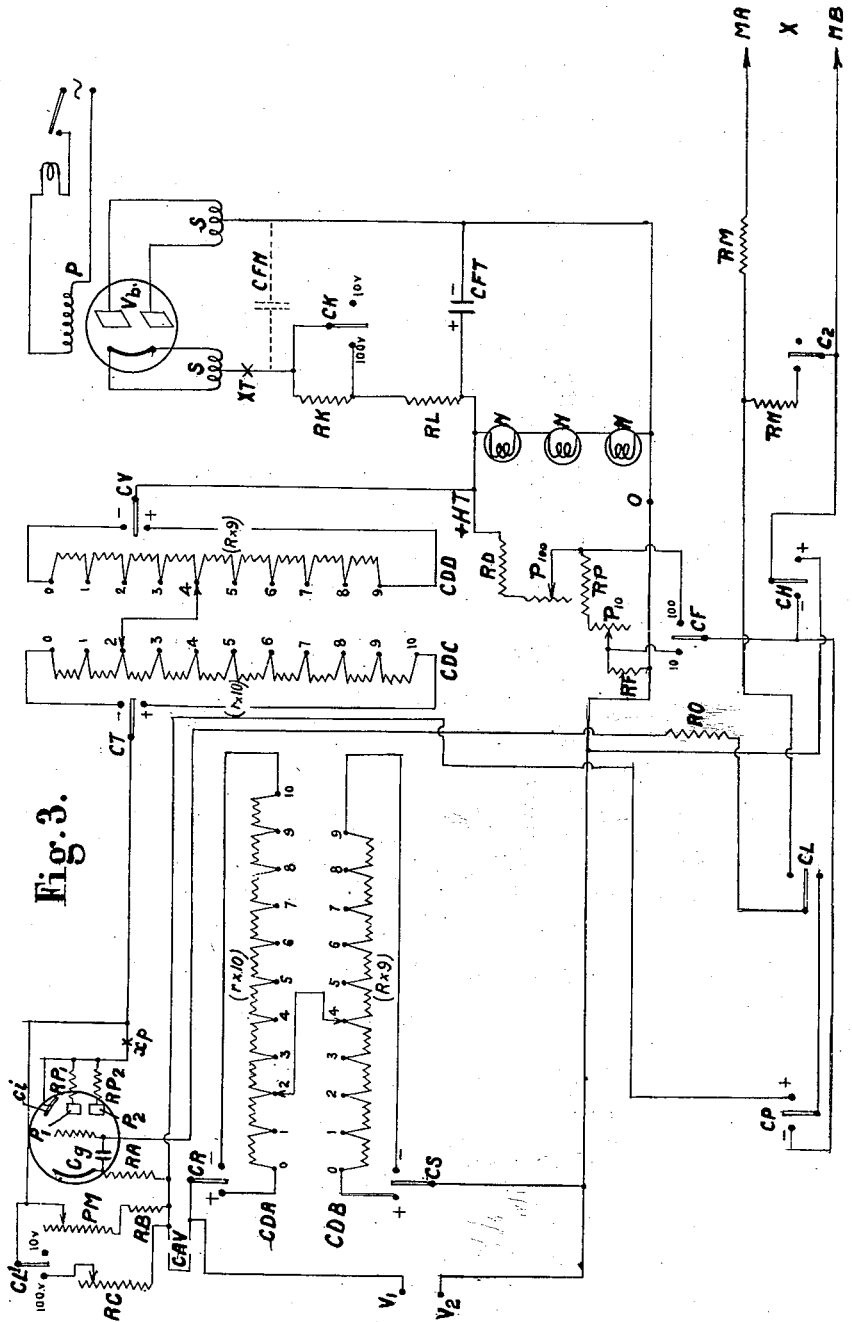

Patented Jan. 1, 1952

2,581,011

UNITED STATES PATENT OFFICE 2,581,011

ELECTRONIC VOLTMETER WITH CALIBRATED RESISTORS

Maurice Fouquart, Paris, France

Application February 27, 1946, Serial No. 650,665
In France August 13, 1943

7 Claims. (Cl. 171—95)

The present invention relates to a vacuum tube voltmeter adapted for use for all electrical and radio-electrical purposes, the apparatus being based on the fact that the grid of a tube of the type commonly known in the radio art by the name of "magic eye" (or tuning indicator tube) will consume substantially no current when said grid is brought to a potential which is slightly negative with respect to the cathode, say to the extent of about 3 volts for the usual types of construction. It follows that it may be used for measurement purposes without any voltage consumption and without the necessity of resorting, as in the prior art, to measuring devices involving mechanical deflection of say, a movable coil or the like.

The arrangement of this voltmeter will be described with reference to the diagrams shown in the accompanying drawing which are given merely by way of examples. In the drawing:

Fig. 3 is a circuit diagram of the voltmeter of the invention.

Figure 1:
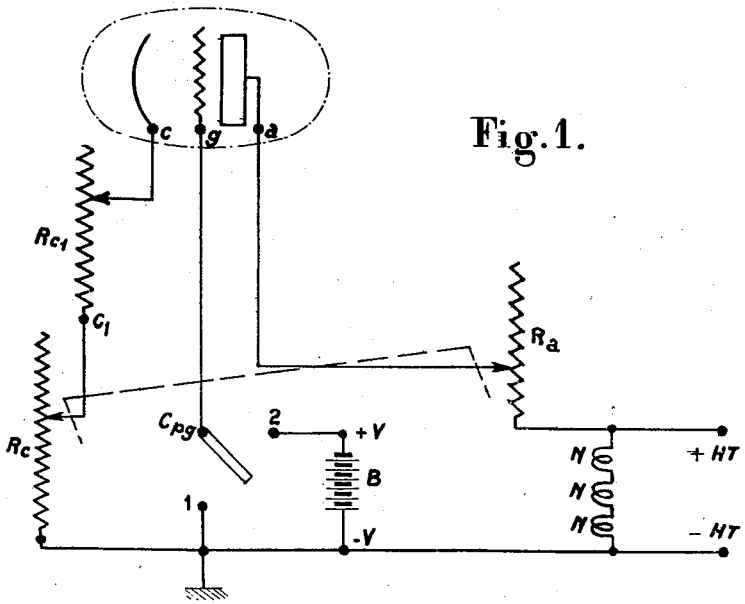
Fig. 1 is a diagram showing the principle of the measuring procedure used.
Figure 2:
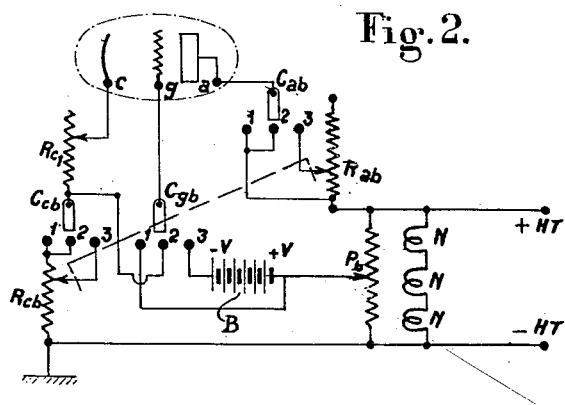
Fig. 2 is a diagram showing modifications made in the device used in Fig. 1 in order to adapt it for measuring voltages under special conditions.

The diagrams shown in Fig. 1 and Fig. 2 are merely illustrative of the principle and are intended to facilitate understanding of the operation per se of the apparatus claimed and as described with reference to Fig. 3.

In Fig. 1, the voltage V which is to be measured is that prevailing between the terminals of a battery B.

+HT and —HT designate two terminals connected to a source of high tension and between which are interposed the neon tubes N which regulate this voltage. The —HT terminal is furthermore connected to the body of the framework (grounded) as is also the — pole of the battery B. In practice the body of the framework is preferably grounded to the earth in the majority of cases.

$c$, $g$, $a$ designate the cathode, grid, and anode of an ordinary vacuum tube of the so-called "tuning indicator" type. The anode $a$ is connected to the +HT terminal, through intermediary of a rheostat $Ra$. The cathode $c$ is connected to the body of the apparatus (grounded) through intermediary of two rheostats in series, $Rc_1$ and $Rc$. Furthermore, a switch $Cpg$ makes it possible to connect the grid $g$ either to the body of the apparatus (ground) by means of contact 1 or to the +V pole of the battery through the contact 2.

Let it first be assumed that the slider of the rheostat $Rc$ is at the zero point and the switch is set on contact 1. The slider of the rheostat $Rc_1$ is then adjusted once and for all so that the grid bias thus produced is sufficient both to effect suppression of the grid current and to position the image on the tube at a point that can be readily indexed or located, for example as the junction of two luminous sectors.

The switch is then placed on contact 2 so that the voltage to be measured is applied to the grid. The image in the tube will vary immediately. In order to reproduce the initial image without disturbing the adjustment of $Rc_1$, the resistance of the rheostat $Rc$ must be altered in such fashion as to produce between $c_1$ and the ground, a voltage that is equal to the voltage V that is to be measured.

In lieu of measuring this voltage with the aid of an ordinary voltmeter, it can be determined in accordance with the present invention by passing a current of fixed intensity through the rheostat $Rc$. In order to produce this unvarying current, use is made of the voltage HT which is regulated by the neon tubes N, and the operating shafts of the rheostats $Ra$ and $Rc$ are so connected that the sum of the resistances of these rheostats is always constant.

It is apparent that if the impedance of the tube between $a$ and $c$ as well as the impedance of $Rc_1$ remains constant, the fact that $Rc+Ra$ is rendered constant irrespective of the variations of $Rc$ will result in rendering the total impedance between +HT and —HT constant and consequently serve, under the influence of the constant voltage prevailing between +HT and —HT to produce a current of constant intensity in $Rc$, $Rc_1$ $Ra$.

The position which the slider of the rheostat $Rc$ must occupy in order to reproduce the initial image at the electronic tube will therefore be a function determined by the voltage V, so that if this rheostat $Rc$ is calibrated (obviously for a fixed value of $Rc_1$) it will serve to measure the voltage V; this calibration should be preliminarily effected with the aid of calibrated voltage sources or determined by calculation and it may be marked off in volts.

The arrangement thus constituted, may, in practice, be embodied in various ways, depending on the applications contemplated and the nature of the voltage sources utilized.

For example, in case the negative pole of the voltage to be measured cannot be connected to the body of the apparatus (grounded), for example because of the necessity of keeping the insulation perfect, the device described above may be modified as shown in Fig. 2:

In this case, three switches Ccb, Cgb and Cab may be used to connect the cathode, the grid and the anode of the electronic tube to three respective groups of terminals 1, 2, 3. These switches are so interconnected as simultaneously to close the three contacts 1 or the three contacts 2 or the three contacts 3. Between the + and − terminals of the voltage source HT, regulated by the neon tubes N, is connected a potentiometer Pb, the slider of which is connected to the + terminal of the source of voltage V that is to be measured and to the terminal 1 of the switch Cgb.

The cathode is connected to the body of the apparatus (grounded) through intermediary of the rheostat $Rc_1$, the switch Ccb and the rheostat Rcb. Moreover, the grid may be connected by means of switch Cgb either to the + terminal of the voltage to be measured or to the rheostat $Rc_1$, or to the − terminal of the voltage that is to be measured. The rheostats Rcb and Rab are coupled together mechanically like Ra and Rc of Fig. 1.

When the three switches of Fig. 2 are in position 2, adjustment of $Rc_1$ is made once for all. The image of the tube is positioned, as already recited, at an easily identified point. Position 1 is then resorted to. It will then be perceived that in order to regain the original image, it is necessary to adjust the potentiometer Pb at a point which will give, between +V and −HT, a voltage equal to the maximum measuring voltage of the apparatus (maximum voltage between $C_1b$ (or Ccb) and −HT).

This being effected, resort is had to position 3 or the measuring position.

It is apparent that in order always to regain the same image, Rcb/Rab must be manipulated in fashion that: Measured voltage=maximum measurable voltage—the voltage read off at Rcb/Rab.

In order to simplify matters, the point of comparison (position 2) may be taken, not at $C_1b$, (or Ccb) after having brought the resistance of Rcb to a maximum and nullified the resistance of Rab, but simply taken at the rheostat Pb, which will eliminate the use of two switches.

This simplified arrangement is utilized in the embodiment shown in Fig. 3.

This figure shows the two anodes $P_1$, $P_2$ and the target $ci$ of the "magic-eye" (tuning indicator tub).

MA and MB indicate the terminals to which the voltage X to be measured is applied.

RA, RB, RC, RD, RF, RK, RL, RM, RN, RO, RP, $RP_1$, $RP_2$ designate resistances of which some are fixed and others adjustable.

CDA, CDB, CDC, CDD are the resistance switches, arranged in series, the contacting members of CDA and CDC (10 resistances $r$ in series, for example) being coupled together in such fashion that the sum of the resistances utilized in each pair of rheostats is constant. The same applies as to CDB which is coupled with CDD (9 resistances R, ten times stronger, in series, for example, to obtain a sum total of $100r$).

CLI, CK, CF are three two-position switches rigidly coupled together. These are three elements of the usual radio switch of the 3-circuit, 2 position type, for example.

Two positions, for example, correspond to the two reading scales desired. (10 and 100 volts or 50 and 500 volts.)

The number of scales used is obviously not limited to two.

Likewise the contacting members CR, CS, CT, CV, CP, CH are rigidly coupled together. CL is always used for passing from the index or identifying point to the point of comparison.

$C_2$ is used for imparting a multiplying effect to the measuring apparatus by causing it to operate as a potentiometer (non-infinite resistance in this single case).

N designates the neon tubes which serve for regulating the voltage of the supply source.

Two potentiometers $P_{10}$ and $P_{100}$ make it possible to bring the terminals of the switch CF to two predetermined potentials corresponding to the two scales, for example, 10 and 100 volts.

Another potentiometer PM is used only when the "magic eye" tube is replaced by another, for the purpose of compensating for any variation in the total regulated voltage.

One of the features of the invention consists, as recited above, in automatically indicating in the anode circuit the value of the resistance used for decreasing the cathode circuit c.

If UG is the total potential difference between O and HT or the general overall regulated voltage, UC the difference in potential between the cathode and O, UL the difference in potential between the cathode and the plates of the "magic eye" tube.

UP the difference in potential between the plates and HT, it follows from the original switch connections used, that, if (by definition)

$$UG=UC+UL+UP,$$

we would likewise obtain, irrespective of the variations assigned to UC, the value $$UC+UP=\text{constant},$$

whence $$UL=\text{constant}$$

Furthermore, if, during the various measurements made (necessary to facilitate reading) the difference in potential between the grid and the ground is constant and slightly negative, a perfectly constant current will flow through the resistances.

Consequently, with the aid of known, calibrated and unvarying resistances the operator can produce a difference in potential of his own choosing which can be read off at the resistance switches, either the switch CDA which is mechanically coupled with CDC and calibrated for example from 0 to 10 volts, or at the switch CDB which is mechanically coupled to CDD and calibrated for example from 0 to 90 volts, in 10 volt increments.

It is merely necessary to use the compensation potentiometer PM for regulating the current to a known value so as to be able to determine the difference in potential over the known potential since it varies as a direct function of this value at UC.

In a test apparatus, in order to obtain the multiplying effect hereinafter discussed, I may be chosen as equal to 4 ma. (milliamperes), $r$=25 ohms, R=250 ohms; so that .1 volt would be obtained for each variation at CDA or 1 volt as a total and 1 volt for each variation at CDB or 9 volts as a total for CDB.

If the output in the measuring resistances is increased by means of switches $CL_1$ and CK, and the power consumption of the system is brought to 40 ma., the set-up will give 1 volt for each position of CDA and 10 volts for each position of CDB or 100 volts as a total.

The cathode resistance RA yields a cathode voltage that is slightly positive with respect to the zero of the measuring switches. The grid is therefore slightly negative with respect to the cathode, which is essential to avoid any power output.

This resistance moreover makes it possible to locate the permanent operating point of the "magic eye" tube at a position where the shadow angle is greatest (in both directions) for a given low potential difference.

If, in order best to fulfill the later condition, it is desired to vary this point of operation, a compensation system may be used similar to that shown for the measurement switches CDA/CDC and CDB/CDD per se.

If for example it is desired to have three shadow angle regulating positions, a variable resistance system is connected in at $xp$ in such fashion that $$RA + R \times 0 = \text{constant}$$

that is, for example, in the

1st position: $RA=1000$ and $Rxp=400$
2nd position: $RA=1200$ and $Rxp=200$
3rd position: $RA=1400$ and $Rxp=0$ and the plug switch CAV may be used to insert, for calibration purposes, a millivoltmeter having a low potential difference between its terminals, which may furthermore be compensated in practice by means of an equivalent resistance.

Furthermore, the two terminals $V_1$ and $V_2$ make it possible to verify results by means of any voltmeter. It is to be noted that this voltmeter involves but a small power consumption compared to the total consumption since the simultaneous coincidence of the measurements taken at the voltmeter and at the switches is perfect.

At all events the agreement with the voltage to be measured is exact if the switches are not taken into account.

The potentiometer PM, in series with the resistance RB makes it possible to adjust the consumption of the circuit as a whole to the first comparison intensity.

It is obviously possible to measure negative voltages by placing the negative point at MB, but this method of procedure is unsuited for the use for which an electronic voltmeter is intended, that is, for measuring small output voltages (E. M. F. at high internal resistances); if the point MA, connected only to the grid of a tube shows perfect insulation, this will not be so at MB where the slightest fault is not attributable to any direct connection with the secondary of the supply transformer.

The solution described above would therefore be used.

The general diagram (Fig. 3) shows how the problem of measuring negative voltages is solved. For this purpose the switches CH, CP, CS, CT, CV, and CR are operated so as to set them on the negative instead of the positive contacts.

The point MB is then brought, with respect to the ground, to a positive potential equal to the maximum voltage of the scale employed (10 volts and 100 volts, for example); the potentiometers $P_{100}$ and $P_{10}$ make it possible to adjust these voltages to suitable values. It will be noted that these various potentiometers need not be manipulated during each operation, but are to be manipulated only during starting and for verifying results from time to time.

If calibrated resistances are used in the apparatus, the 10 and 100 volt potentials may remain fixed, although it is preferable to be able to readjust these basic voltages. The values 10 and 100 however are merely arbitrarily chosen by way of example.

The switch CK and the resistance RK serve to provide the voltage necessary for the measurements, either 100 volts or 10 volts, alternatively, in the case under consideration.

The neon tubes N are in practice sufficiently constant for use in regulating the required voltage but since they differ between each other so far as the regulated voltage is concerned, the $+100$ volts is not taken off between the first and second tube.

In principle, the fixed comparison voltages of 10 and 100 volts are adjusted so as to effect closing of the "magic eye" to an extent equal to that commonly used in effecting positive measurements.

A novel method for reversing the terminals CR, CS, CT, CV of the rheostats associated with each switch makes it possible to preserve the same reading on the instrument board.

In the absence of this special system, the switches must be doubly calibrated, as follows:

For positive voltages: 0, 1, 2, 3, 4, etc.
For negative voltages: 10, 9, 8, 7, 6, etc.

RL and the electrolytic condenser CFT constitute a filter unit with CFN. These condensers may be disconnected readily when taking positive measurements; an inductance may be inserted at XT.

The resistances RM and RO along with the capacity of the conductor MA constitute a filter adapted to eliminate alternating current components, especially the HF components.

It is to be noted that the resistance RL is necessary so as to permit effective regulation of the voltage by the neon tubes.

It may also be pointed out that the system used for setting the apparatus does not require the obtaining of an absolutely precise overall voltage.

If, for example, 300 volts be taken as the overall difference in potential, and only 295 volts are available, assuming that the regulation is effected with the aid of PM (variable) and RC (which is preferably variable), so as to produce a given intensity, the same measuring voltage would always be available, the + or − volts of the overall voltage only being indicated on the tube.

However, fresh regulation is necessary whenever a tube is changed (that is, the "magic eye" tube, and especially the regulating tubes).

In practice, adjustment is most frequently effected by measuring, for example with the aid of the apparatus, a known test such as 10 or 100 volts, for example, which can be verified with the aid of a line voltmeter of any suitable type.

Figure 4:
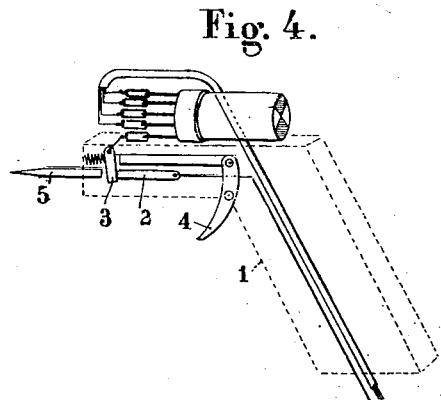
Fig. 4 is a detail view showing a portable voltage take-off test device.

The possibilities for using this apparatus may moreover be extended in the following manner: In order to reduce to a minimum the input capacity without however rendering the grid sensitive to parasitic oscillations (effect of the hand on the steatite prod, or alternating voltage resulting from capacity effects) the principal circuit terminals of the "magic eye" tube may be connected by means of a switch to a socket disposed on a support. By means of a suitable prod and cord the "magic eye" tube OM can be led off to a movable support 1 (Fig. 4) shaped like a pistol, the visible portion of the "magic eye" tube being turned towards the operator. The support for the "magic eye" tube (support and sleeve preferably made of steatite) is provided with a rod 2 (shielded) in lieu of a grid, and adapted to effect contact with a minimum of loss due either to capacity effects or resistance contact effects.

Contact is effected through the flexible blade 3 (silver contact and steatite insulation) operated by a "trigger" 4 of the portable apparatus and serves to connect the grid of the "magic eye" tube either with the contact prod 5 or with the point of comparison such as CL (Fig. 3), the grid being then connected directly to the circuit that is to be measured without any series resistance or parallel capacity, the point MB of Fig. 3 being also connected in.

The absence of all parasitic oscillations therefore makes it possible not only to measure the continuous component of a continuous modulated voltage but also to evaluate the modulated component of such voltage.

In the absence of such a system, comprising a portable "magic eye" tube, the grid measuring circuit would have to be very thoroughly insulated and if possible, shielded (i. e. of the low-loss anti-parasitic antenna type).

It should however be noted that when taking negative measurements the switch CL does not permit making the same comparison as in the case of positive measurements.

In order not to encumber the circuit of Fig. 3 with another switch, it need merely be brought to zero with the aid of scales arranged in tens so as to obtain the comparison point.

An interesting application of the apparatus resides in its use for measuring the negative oscillation voltage at the terminals of the oscillation resistance of a vacuum tube, a "6-A-8" tube for example, in which case the point MB is connected to the cathode and the point MA directly connected to the oscillator grid (the resistance of 8 megohms being disposed at the end of the nipper-equipped prod). It is possible to observe (i. e. "see") the variation at the tuning indicator tube ("magic eye") in proportion as the oscillation condenser of the radio set undergoing examination is turned.

This use is especially interesting for verifying oscillation factors in radio receivers of the frequency changer type (i. e. by short-circuiting the variable condenser of the oscillator circuit, the residual negative voltage can be measured) and for adjusting and checking oscillator coils, especially those intended for short wave work.

CL1, CF, CK for example are three of the circuits of a switch of the single bar, 4-contact, 3-position type; the 10 volt, 100 volt scale is used; (the 4th contact cuts the primary of the feed transformer).

Furthermore, it is apparent that in view of the zero consumption of the apparatus, the presence of a resistance at RM will not produce any appreciable variation in the reading. On the contrary, it is merely necessary to connect the resistance RN in by means of switch C2 to obtain a reading that can be multiplied by a predetermined coefficient. Thus:

$$\text{Voltage to be measured} = \text{voltage read} \times \frac{RN}{RM+RN}$$

The resistances RM and RF constitute the elements of a filter adapted to eliminate alternating components and especially HF components.

In practice, if high values be assigned to the resistances RM and RF, it may be sufficient, in order to eliminate all disturbances, to add a single capacity at Cg, to use a shield "magic eye" tube, and to use the capacity of the circuit that connects MA to the grid.

The "magic eye" tube has the following advantageous properties:

1. Very great sensitivity in one of the shadow sectors.
2. Perfect luminosity, for example capable of giving luminous screen images making it possible to observe very slight variations in the shadow sector.
3. The support of the tube is of steatite or of the "Loktal" "all-glass" type.

In cases where a low overall regulating intensity is utilized, the heating of the tube may affect the output, in which case it may be preferable to insert an iron-hydrogen intensity regulating tube in the primary of the feed transformer.

It is obvious that the invention is not limited to the circuits described, which are merely shown by way of example without any intention of limiting the scope.

It is possible with the aid of the same apparatus to measure high resistances as by connecting the same with a series resistance of known value and measuring the voltage drop between the terminals of one of these resistances; the ratio of this voltage drop to the total potential difference gives the value sought.

Furthermore, a diode tube may be inserted in the measuring circuit so as also to measure alternating voltages (voltage peaks).

Having thus described the invention, what is claimed is:

1. An electronic voltmeter comprising an electronic visual indicating tube of the "tuning indicator tube" type having at least a cathode, a grid and an anode, in combination with a first source of known voltage, a second source having an unknown voltage to be measured, each of said sources having poles of positive and negative polarity, a connection between the negative poles of said sources for maintaining said poles at the same potential, and two rheostats associated mechanically in such fashion that the sum of the variable resistances which they interpose to the passage of a current is constant, one of said rheostats being connected between the anode of said tube and the positive pole of the source of known voltage, the second rheostat being connected between the cathode and the negative pole common to said voltage sources, and a switch adapted to connect the grid of said tube, at will, either with the positive pole of the source of unknown voltage, or through the second rheostat, with the negative pole of said sources.

2. An electronic voltmeter according to claim 1 in which each of the two rheostats is composed of a series of ten resistances of one ohm each and a series of resistances of ten ohms each, and a movable connection means adapted to connect any resistance of the first series with any resistance of the second series.

3. An electronic voltmeter according to claim 1 in combination with means for changing the voltage impressed on the first voltage source and applied to the elements of the electronic tube.

4. An electronic voltmeter according to claim 1 in combination with switches adapted to disconnect the negative pole of the source of unknown voltage as well as the ends of the two rheostats previously connected and to connect the other ends of these opposed rheostats with the positive poles of the two voltage sources, the positive pole of the source of unknown voltage being then connected either to the grid of the electronic tube or the negative pole of source of known voltage through intermediary of a resistance.

5. An electronic voltmeter according to claim 1 in which the electronic tube is mounted in a movable insulating support, said support comprising a handle adapted to permit the operator to hold the same like a pistol, a contact prod at the front of said support, a switch mounted on said support, a trigger adapted to actuate said switch, the visual indicator portion of said electronic tube being directed rearwardly and the conductors which connect the elements of said tube to the voltage sources and to the rheostats of the voltmeter being grouped in a flexible cable, said switch being inserted in the grid circuit of the tube and adapted at will to connect said grid with said contact prod.

6. An electronic voltmeter comprising an electronic visual indicating tube of the so-called "tuning indicator tube" type provided at least with a cathode, a grid, an anode and a fluorescent screen giving a reading when bombarded by the electrons emitted by the cathode, means to apply between the grid and the cathode of said tuning indicator tube alternatively the voltages of a source of which the voltage is known and of a source of which the voltage is unknown and is to be measured, and means to vary the voltage of the source of which the voltage is known without changing the impedance of the circuit comprising said source and the tuning indicator tube, until the reading of said tuning indicator tube is maintained constant, the unknown voltage then being equal to the known voltage.

7. An electric voltmeter comprising an electronic visual indicating tube of the "tuning indicator tube" type in combination with a first source of known voltage, a second source of which the unknown voltage is to be measured, circuits for connecting said sources to said tube, means for closing said circuits successively, a first rheostat for modifying the voltage of the first source acting on the tube, a second rheostat mechanically connected with the first rheostat in such a fashion that the impedance of the circuit of the first source remains constant with variation of the positions of said rheostats, one of the rheostats having graduations to permit reading the voltage of the second source when the tuning indicator tube gives the same indication under the action of the two sources.

MAURICE FOUQUART.

REFERENCES CITED

The following references are of record in the file of this patent:

UNITED STATES PATENTS

| Number | Name | Date |
|---|---|---|
| 2,171,216 | Koch | Aug. 29, 1939 |
| 2,175,690 | Happe | Oct. 10, 1939 |
| 2,235,173 | Shepard | Mar. 18, 1941 |
| 2,263,932 | Schnoll | Nov. 25, 1941 |
| 2,272,849 | Perkins | Feb. 10, 1942 |
| 2,359,572 | McWhirter et al. | Oct. 3, 1944 |